(12) United States Patent
Li (10) Patent No.: US 10,497,293 B2
(45) Date of Patent: Dec. 3, 2019

(54) DISPLAY DEVICE HAVING A BARRIER PANEL FOR DISPLAYING WIDE-VIEWING AND NARROW-VIEWING MODES AND DISPLAY METHOD THEREOF

(71) Applicant: Beijing Xiaomi Mobile Software Co., Ltd., Haidian District, Beijing (CN)

(72) Inventor: Guosheng Li, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 73 days.

(21) Appl. No.: 15/819,181

(22) Filed: Nov. 21, 2017

(65) Prior Publication Data

US 2018/0144671 A1 May 24, 2018

(30) Foreign Application Priority Data

Nov. 22, 2016 (CN) .......................... 2016 1 1058975

(51) Int. Cl.
*G09G 3/00* (2006.01)
*G09G 3/36* (2006.01)
(Continued)

(52) U.S. Cl.
CPC .............. *G09G 3/001* (2013.01); *G09G 3/20* (2013.01); *G09G 3/36* (2013.01); *H04N 13/31* (2018.05);
(Continued)

(58) Field of Classification Search
CPC .................................................... G09G 3/001
(Continued)

(56) References Cited

U.S. PATENT DOCUMENTS 5,528,319 A 6/1996 Austin
2009/0040426 A1* 2/2009 Mather ................ H04N 13/312
349/65
(Continued)

FOREIGN PATENT DOCUMENTS

CN 1601331 A 3/2005
GB 2405544 A 3/2005
(Continued)

OTHER PUBLICATIONS

Partial Supplementary European Search Report in EP Application No. 17202868.0, dated Mar. 21, 2018, 12 pages.
(Continued)

*Primary Examiner* — Long D Pham
(74) *Attorney, Agent, or Firm* — Arch & Lake LLP (57) ABSTRACT

A display device is provided, which includes a controller, a display driver connected with the controller, a display panel connected with the display driver, a first barrier panel positioned above the display panel and a second barrier panel positioned above the first barrier panel. A plurality of first barriers arranged in parallel at intervals are distributed in the first barrier panel. A plurality of second barriers arranged in parallel at intervals are distributed in the second barrier panel. The controller is configured to send an image frame to the display driver. The display driver is configured to drive the display panel to display the image frame on display regions which are arranged in parallel at intervals. Each display region is configured to display a part of displayed contents in the image frame individually. The display device provides a wide-viewing-angle mode and a narrow-viewing-angle mode.

16 Claims, 4 Drawing Sheets

Fig. 3A (51) Int. Cl.
　　*G09G 3/20* (2006.01)
　　*H04N 13/31* (2018.01)
　　*G02F 1/13* (2006.01)
　　*H04N 5/72* (2006.01)

(52) U.S. Cl.
　　CPC ..... *G02F 1/1323* (2013.01); *G09G 2320/028* (2013.01); *G09G 2320/068* (2013.01); *G09G 2340/045* (2013.01); *G09G 2340/0421* (2013.01); *G09G 2358/00* (2013.01); *H04N 5/72* (2013.01)

(58) Field of Classification Search
　　USPC ........................................................ 345/697
　　See application file for complete search history.

(56) References Cited

U.S. PATENT DOCUMENTS

| 2011/0159929 A1* | 6/2011 | Karaoguz | H04N 21/4312 455/566 |
| 2014/0118332 A1* | 5/2014 | Kim | G09G 3/003 345/214 |

FOREIGN PATENT DOCUMENTS

| KR | 20080058974 A | 6/2008 |
| KR | 20090033624 A | 4/2009 |

OTHER PUBLICATIONS

Chinese Office Action (including English translation) issued in corresponding CN Patent Application No. 2011058975.5, dated Nov. 15, 2018, 23 pages.

* cited by examiner

DISPLAY DEVICE HAVING A BARRIER PANEL FOR DISPLAYING WIDE-VIEWING AND NARROW-VIEWING MODES AND DISPLAY METHOD THEREOF

CROSS-REFERENCE TO RELATED APPLICATION

This application is filed based upon and claims priority to Chinese Patent Application No. 201611058975.5, filed on Nov. 22, 2016, the entire contents of which are incorporated herein by reference.

TECHNICAL FIELD

The present disclosure generally relates to the technical field of display, and more particularly, to a display device and a display method.

BACKGROUND

A display screen is one of the most common input and output devices on electronic equipment. A display screen has a capability of displaying text information, image information and video information.

At present, a display screen is usually a wide-viewing-angle display screen, and a viewing angle approximately ranges from 120° to 170°. When a user uses electronic equipment in a crowded place such as on a bus and a metro, others around the user can easily view contents on a display screen, thereby causing leakage of privacy of the user.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

According to a first aspect of the present disclosure, a display device is provided. The display device may include: a controller, a display driver connected with the controller, a display panel connected with the display driver, a first barrier panel positioned above the display panel and a second barrier panel positioned above the first barrier panel. A plurality of first barriers which are arranged in parallel at intervals may be distributed in the first barrier panel, and a first light transmission region may be formed between every two adjacent first barriers. A plurality of second barriers which are arranged in parallel at intervals may be distributed in the second barrier panel, and a second light transmission region may be formed between every two adjacent second barriers. The controller may be configured to send an image frame to the display driver. The display driver may be configured to drive the display panel to display the image frame in a plurality of display regions which are arranged in parallel at intervals. Each display region is configured to display a part of displayed contents in the image frame individually. The part of the displayed contents individually displayed by each display region may be emitted to a predetermined visible range through the first light transmission region and the second light transmission region which are corresponding to the display region.

According to a second aspect of the present disclosure, a display method is provided. The display method may be applied to a display device, the display device including: a controller, a display driver connected with the controller, a display panel connected with the display driver, a first barrier panel positioned above the display panel and a second barrier panel positioned above the first barrier panel. A plurality of first barriers which are arranged in parallel at intervals may be distributed in the first barrier panel, and a first light transmission region may be formed between every two adjacent first barriers. A plurality of second barriers which are arranged in parallel at intervals may be distributed in the second barrier panel, and a second light transmission region may be formed between every two adjacent second barriers. The method may include: sending, by the controller, an image frame to the display driver; and driving, by the display driver, the display panel to display the image frame in a plurality of display regions which are arranged in parallel at intervals, each of the plurality of display regions being configured to display a part of displayed contents in the image frame individually, and causing the part of the displayed contents individually displayed by each of the plurality of display regions to be emitted to a predetermined visible range through the first light transmission region and the second light transmission region corresponding to the display region.

It is to be understood that the above general descriptions and detailed descriptions below are only exemplary and explanatory and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations matched with the present disclosure. Instead, they are merely examples of apparatuses and methods matched with aspects related to the present disclosure as recited in the appended claims.

Certain terms used in the present disclosure are only intended to describe specific aspects, but are not intended to limit the present disclosure. For example, singular form words "a," "said," and "the" used in the present disclosure and the appended claims are intended to include plural form, unless otherwise clearly stated. Also, the term "and/or" used herein refers to any or all combinations of one or more listed related items.

It is to be understood that although the aspects of the present disclosure may apply terms including first, second, third and so on to describe various information, these information should not be limited to these terms. These terms are only used for distinguishing information of the same type from each other. For example, first information may be also called second information without departing from the scope of the aspects of the present disclosure, and similarly, second information may be also called first information, which depends on context. For example, the word "if" used here may be interpreted as "at the moment when . . . " or "when . . . " or "in response to confirmation".

It is to be noted that although the flowcharts in some exemplary aspects describe each step as a sequenced process, a variety of steps therein may be implemented in parallel, concurrently or simultaneously. In addition, the sequence of all steps may be re-arranged. When the operation is completed, the process may be ended, but additional steps not included in the accompanying drawings may be executed. The process may correspond to a method, a function, a regulation, a sub-routine, a sub-program and the like.

The embodiments of the present disclosure provide a display device with a relatively narrow viewing angle and a display method. Optionally, the display device may also be switched between a wide-viewing-angle mode and a narrow-viewing-angle mode, wherein the display device may be any electronic device with a display screen, such as a mobile phone and a tablet computer.

Figure 1:
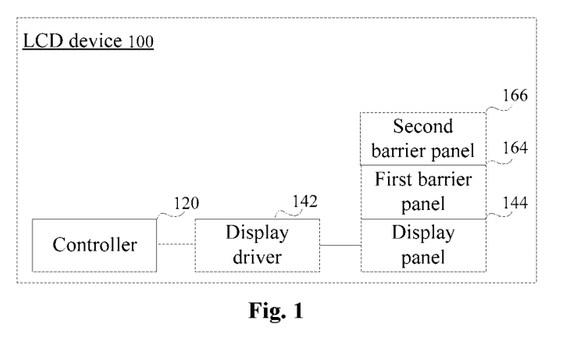
FIG. 1 is a block diagram of a display device according to an aspect of the disclosure.

FIG. 1 is a block diagram of a display device 100 according to an aspect of the disclosure. The display device 100 may implement narrow-viewing-angle display by virtue of a parallax barrier method. As shown in FIG. 1, the display device 100 includes: a controller 120, a display driver 142 connected with the controller 120, a display panel 144 connected with the display driver 142, a first barrier panel 164 arranged above the display panel 144 and a second barrier panel 166 positioned above the first barrier panel 164.

The controller 120 may be a processor or a graphics processor. The controller 120 has capabilities of outputting an image frame and sending a control instruction.

The display driver 142 includes a driving circuit and is configured to drive the display panel 144 for displaying. The display panel 144 may be a Liquid Crystal Display (LCD) panel or an Organic Light-Emitting Display (OLED) panel. Optionally, when the display panel 144 is an LCD panel, the display device 100 further includes a backlight source positioned below the LCD panel.

A plurality of first barriers which are arranged in parallel at intervals are distributed in the first barrier panel 164, and displayed contents positioned below the first barriers may be blocked by the first barriers on the first barrier panel 164. A plurality of second barriers which are arranged in parallel at intervals are distributed in the second barrier panel 166, and displayed contents positioned below the second barriers may be blocked by the second barriers on the second barrier panel 166.

A distance between the first barrier panel 164 and the second barrier panel 166 may be preset.

The first barrier panel 164 may include a first film on which the plurality of first barriers arranged in parallel at intervals are distributed. The first barriers on the first barrier panel 164 have relatively poor light transmittance. The first barriers may be made of a material which is semitransparent or nontransparent or of which opaqueness is higher than a first threshold value. A region between every two adjacent first barriers is a first light transmission region, and the first light transmission region has relatively high light transmittance. For example, the light transmittance of the first light transmission region is higher than a second threshold value, and the second threshold value is, for example, 80%. When the first barrier panel 164 includes a film made of the film material, a width and position of each first barrier may be designed according to a practical requirement, which will not be limited in the embodiment.

The second barrier panel 166 may include a second film on which the plurality of second barriers arranged in parallel at intervals are distributed. The second barriers on the second barrier panel 166 have relatively poor light transmittance, and the second barriers may be made of a material which is semitransparent or nontransparent or of which opaqueness is higher than a second threshold value. A region between every two adjacent second barriers is a second light transmission region, and the second light transmission region has relatively high light transmittance. For example, the light transmittance of the second light transmission region is higher than the second threshold value, and the second threshold value is, for example, 80%. When the second barrier panel 166 includes the second film made of the film material, a width and position of each second barrier may be designed according to a practical requirement, which will not be limited in the embodiment.

Optionally, in the display device shown in FIG. 1, the first barrier panel and the second barrier panel may both include film materials which are lightproof or which have lower light transmittance than a predetermined condition.

Figure 2:
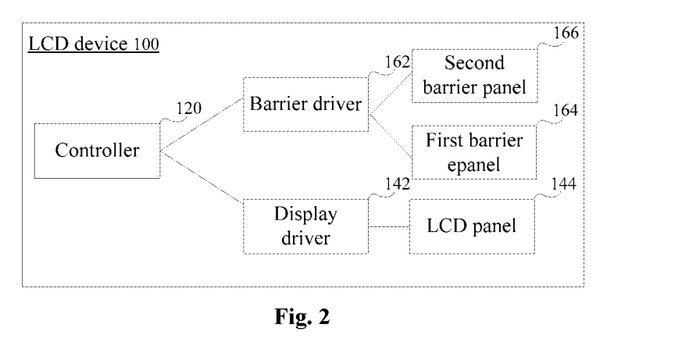
FIG. 2 is a block diagram of a display device according to another aspect of the disclosure.

According to another possible implementation mode, both the first barrier panel and the second barrier panel are panels with variable light transmittance, and the light transmittance is controlled by an electric signal. As shown in FIG. 2, the display device 100 further includes a barrier driver 162. The barrier driver 162 is connected with the controller 120, the first barrier panel 164 and the second barrier panel 166 individually. The barrier driver 162 includes a barrier driving circuit. The barrier driving circuit is also one of driving circuits, and is configured to drive the first barrier panel to form the first barriers and drive the second barrier panel to form the second barriers.

Optionally, the display device 100 further includes: two barrier drivers, i.e. a barrier driver 162a and a barrier driver 162b. The barrier driver 162a is connected with the controller 120 and the first barrier panel 164. The barrier driver 162b is connected with the controller 120 and the second barrier panel 166. The barrier driver 162a includes a first barrier driving circuit. The first barrier driving circuit is also one of driving circuits, and is configured to drive the first barrier panel to form the first barriers. The barrier driver 162b includes a second barrier driving circuit. The second barrier driving circuit is one of the driving circuits, and is configured to drive the second barrier panel to form the second barriers.

Optionally, the first barriers and the second barriers are all parallax barriers which are lightproof or which have lower light transmittance than a predetermined condition. Schematically, when the first barrier panel and the second barrier panel are both LCD panels, the barrier driver 162 drives liquid crystal molecules in the first barrier panel to become twisted to form the first barriers, and the barrier driver 162 drives liquid crystal molecules in the second barrier panel to become twisted to form the second barriers.

Figure 3A:
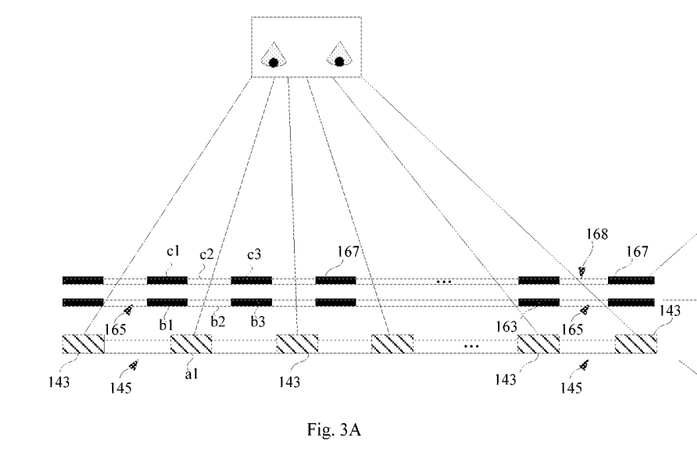
FIG. 3A is a side view of a display device according to an aspect of the disclosure.
Figure 3B:
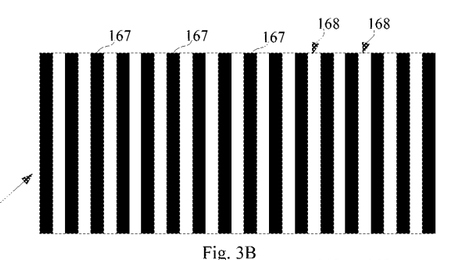
FIG. 3B is a schematic diagram of a second barrier panel of the display device according to an aspect of the disclosure.
Figure 3C:
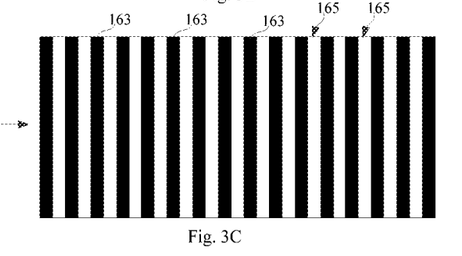
FIG. 3C is a schematic diagram of a first barrier panel of the display device according to an aspect of the disclosure.
Figure 3D:
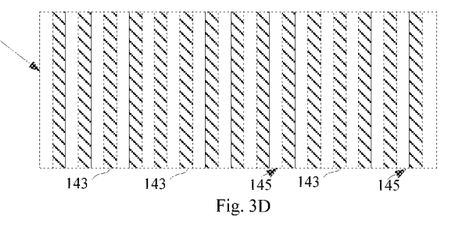
FIG. 3D is a schematic diagram of a display panel of the display device according to an aspect of the disclosure.

With reference to FIGS. 3A-3D, which shows a schematic diagram of operation of the display panel 144, a first barrier panel 164a and a second barrier panel 166a in a narrow-viewing-angle working state. FIG. 3A illustrates s a side view of the display panel 144, the first barrier panel 164a and the second barrier panel 166a. The first barrier panel 164a is positioned above the display panel, and the second barrier panel 166a is positioned above the first barrier panel 164a. FIG. 3B illustrates a front view of the second barrier panel 166a. FIG. 3C illustrates a front view of the first barrier panel 164a. FIG. 3D illustrates a front view of the display panel 144.

In the narrow-viewing-angle working state, the controller 120 sends an image frame to the display driver 142, and sends a barrier control instruction to the barrier driver 162.

The display driver 142 is configured to drive the display panel 144 to display the image frame in a plurality of display regions 143 which are arranged in parallel at intervals, and each display region 143 is configured to display a part of displayed contents in the image frame individually. Optionally, if there are N display regions, each display region is configured to display 1/N of the image frame, and the size of the displayed content displayed on each display region is the same or different. A union of the displayed contents displayed by all the display regions 143 is the same as the complete image frame.

In other words, the image frame is split into multiple strip-type displayed contents. The number of split strips is the same as the number of the display regions, and each displayed content is displayed individually in each display region 143. Each display region 143 is a rectangular strip-type display region. An idle region 145 between every two adjacent display regions 143 may not display any content.

In a possible implementation mode, all the display regions 143 have the same lengths and widths. For example, the length of each display region 143 is 1,080 pixels, and the width is 5 pixels. A width of the idle region 145 between every two adjacent display regions 143 is also the same. For example, the width of each idle region 145 is 3 pixels. In another possible implementation mode, there are at least two display regions 143 with the same length but different widths. For example, the display regions 143 positioned in a central region of the display panel 144 are wider than the display regions 143 positioned in an edge region of the display panel 144. There are at least two idle regions 145 with the same length but different widths. For example, the widths of the idle regions 145 positioned in the central region of the display panel 144 are more than the widths of the idle regions 145 positioned in the edge region of the display panel 144. No restrictive is made in the embodiment.

The barrier driver 162 is configured to control the first barrier panel 164a to form the first barriers 163 in a plurality of first barrier regions which are arranged in parallel at intervals according to the barrier control instruction. The first barriers are parallax barriers which are lightproof or which have lower light transmittance than the predetermined condition. The first barriers can block the displayed contents positioned below the first barriers.

In a possible implementation mode, each first barrier 163 has the same length and width with each other. For example, the length of each first barrier 163 is 1,080 pixels, and the width is 2 pixels. A width of the first light transmission region 165 between every two adjacent first barriers 163 is also the same. For example, the width of each first light transmission region 165 is 3 pixels. In another possible implementation mode, there are at least two first barriers 163 with the same length but different widths. For example, the first barriers 163 positioned in a central region of the first barrier panel 164 are wider than the first barriers 163 positioned in an edge region of the first barrier panel 164. There are at least two first light transmission regions 165 with the same length but different widths. For example, the widths of the first light transmission regions 165 positioned in the central region of the first barrier panel 164 are more than the widths of the first light transmission regions 165 positioned in the edge region of the first barrier panel 164. No restrictive is made in the embodiment.

The barrier driver 162 is further configured to control the second barrier panel 166a to form the second barriers 167 in a plurality of second barrier regions which are arranged in parallel at intervals according to the barrier control instruction. The second barriers are parallax barriers which are lightproof or which have lower light transmittance than the predetermined condition. The second barriers can block the displayed contents positioned below the second barriers.

In a possible implementation mode, each second barrier 167 has the same length and width with each other. For example, the length of each second barrier 167 is 1,080 pixels, and the width is 2 pixels. A width of the second light transmission region 168 between every two adjacent second barriers 167 is also the same. For example, the width of each second light transmission region 168 is 3 pixels. In another possible implementation mode, there are at least two second barriers 167 with the same length but different widths. For example, the widths of the second barriers 167 positioned in a central region of the second barrier panel 166 are more than the widths of the second barriers 167 positioned in an edge region of the second barrier panel 166. There are at least two second light transmission regions 168 with the same length but different widths. For example, the widths of the second light transmission regions 168 positioned in the central region of the second barrier panel 166 are more than the widths of the second light transmission regions 168 positioned in the edge region of the second barrier panel 166. There are no limits made in the embodiment.

Optionally, a first light transmission region b2 of the first barrier panel 164 is positioned directly over a display region a1 in the display panel 144. The first light transmission region b2 is formed between two adjacent first barriers (a first barrier b1 and a first barrier b3). A second light transmission region c2 of the second barrier panel 166 is positioned directly over the first light transmission region b2. The second light transmission region c2 is formed between two adjacent second barriers (a second barrier c1 and a second barrier c3). A displayed content displayed on the display region a1 is caused to be emitted to a predetermined visible range through the first light transmission region b2 and the second light transmission region c2 corresponding to the display region a1.

In a possible implementation mode, each first barrier 163 and the corresponding second barrier 167 have the same length and width. For example, a first barrier 163 has a length of 1,080 pixels and a width of 2 pixels, and the corresponding second barrier 167 also has the length of 1,080 pixels and the width of 2 pixels. Each first light transmission region 165 and the corresponding second light transmission region 168 also have the same width. For example, a first light transmission region 165 has a width of 3 pixels, and the corresponding second light transmission region 168 also has the width of 3 pixels.

In another possible implementation mode, there is at least one first barrier 163 with the same length but different widths with the corresponding second barrier 167. For example, the widths of the first barriers 163 positioned in the central region of the first barrier panel 164 are more than the widths of the second barriers 167 positioned in the central region of the second barrier panel 166. There is at least one first light transmission region 165 with the same length but different widths, compared with the corresponding second light transmission region 168. For example, the widths of the first light transmission regions 165 positioned in the central region of the first barrier panel 164 are more than the widths of the second light transmission regions 168 positioned in the central region of the second barrier panel 166. There are no limits made in the embodiment.

Figure 4:
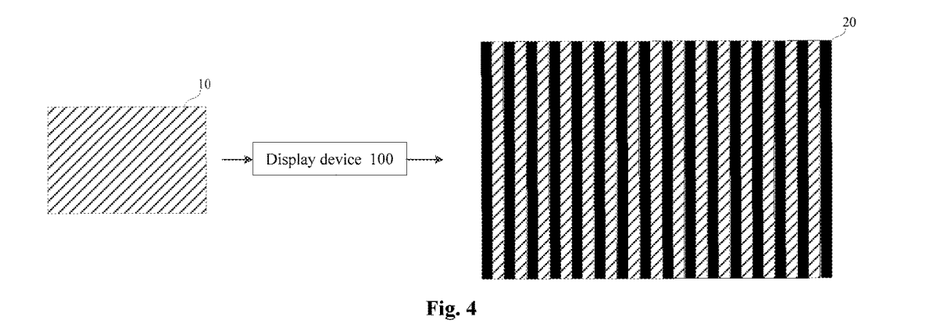
FIG. 4 is a schematic diagram illustrating an effect when an image frame is displayed in the display device according to an aspect of the disclosure.

The displayed content individually displayed by each display region 143 is emitted to the predetermined visible range through the corresponding first light transmission region 165 and second light transmission region 168. That is, when being displayed through the display device 100, the image frame 10 may be split into multiple displayed contents for displaying. A front view of a final display picture 20 may be schematically shown in FIG. 4. In a practical using process, the width of the display barrier between every two adjacent displayed contents is relatively small, so that influence of a final display effect observed by eyes of a user (i.e. a person) can be reduced as much as possible.

Figure 5:
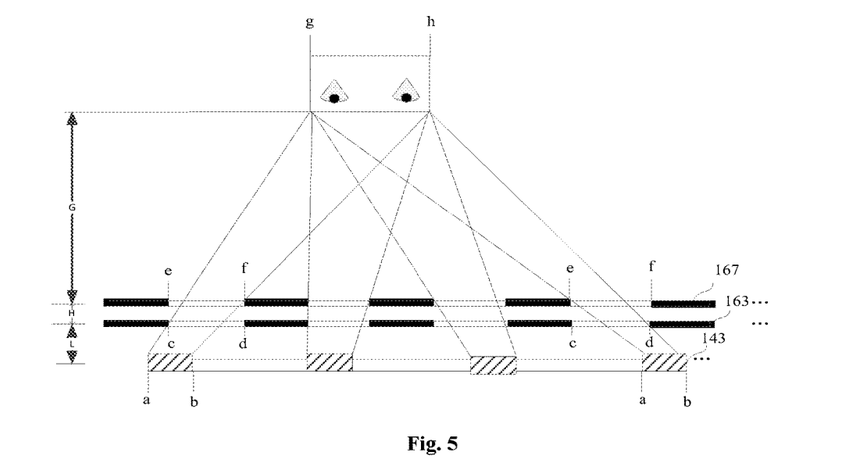
FIG. 5 is a schematic diagram of the principle of the display device according to an aspect of the disclosure.

With reference to FIG. 5, it is set that a left side in FIG. 5 is a first direction and a right side is a second direction. Each display region 143 has an edge a in the first direction, and has an edge b in the second direction. There are two corresponding first barriers 163 above each display region 143, wherein one first barrier 163 has an edge c in the second direction, and the other first barrier 163 has an edge d in the first direction. There are also two corresponding second barriers 167 above each display region 143, wherein a second barrier 167 has an edge e in the second direction, and the other second barrier 167 has an edge f in the first direction. The predetermined visible range has an edge g in the first direction, and has an edge h in the second direction.

Optionally, for each display region 143, when the edge a is on a left side of the edge c, each edge meets a first rule: the edge a, the edge c and the edge g are positioned on the same plane, and the edge b, the edge f and the edge h are positioned on the same plane, thereby ensuring that the displayed content in each display region 143 may only be completely viewed within the predetermined visible range. It is to note that the display region 143 positioned on an outermost edge may have a design different from that in FIG. 5. For example, the display region 143 positioned on the outermost edge is replaced with an idle region.

Optionally, for each display region 143, when the edge a is on a right side of the edge c or the edge a and the edge c are positioned on the same straight line, each edge meets a second rule: the edge a, the edge e and the edge g are positioned on the same plane, and the edge b, the edge d and the edge h are positioned on the same plane, thereby ensuring that the displayed content in each display region 143 may only be completely viewed within the predetermined visible range. It is to note that the display region 143 positioned on the outermost edge may have a design different from that in FIG. 5. For example, the display region 143 positioned on the outermost edge is replaced with an idle region.

In addition, the predetermined visible range is a region for the eyes of the user to view, so that a width of the predetermined visible range is set according to an ocular distance between eyes. Generally, the width of may be slightly wider than the ocular distance between two user eyes. That is, the predetermined visible range is a range which is set according to the ocular distance between the user eyes.

For example, positions of the display regions 143 on the display panel 144 are fixed, positions of the first barriers 163 on the first barrier panel 164 are fixed, and positions of the second barriers 167 on the second barrier panel 166 are fixed. That is, the predetermined visible range is fixed. In this case, the display driver 142 is configured to determine the positions of the plurality of display regions 143 in the display panel 144 according to pre-stored first position information, split the image frame to obtain the displayed content corresponding to each display region 143 and drive each display region 143 to display the corresponding displayed content according to the positions of the plurality of display regions 143.

Optionally, the barrier driver 162 is configured to determine the positions of the plurality of first barrier regions in the first barrier panel 164 according to pre-stored second position information, and drive each of the plurality of first barrier regions to form the corresponding first barrier 164 according to the positions of the plurality of first barrier regions.

Optionally, the barrier driver 162 is configured to determine the positions of the plurality of second barrier regions in the second barrier panel according to pre-stored third position information, and drive each of the plurality of second barrier regions to form the corresponding second barrier 167 according to the positions of the plurality of second barrier regions.

In another example, positions of the eyes are variable, and distances G between the eyes and the display panel 144 are variable, so that the predetermined visible range is variable. In this case, the controller 120 is further configured to send a first position determination instruction to the display driver 142. The display driver 142 is configured to determine the positions of the plurality of display regions 143 in the display panel 144 according to the first position determination instruction, split the image frame to obtain the displayed content corresponding to each display region 143 and drive each display region 143 to display the corresponding displayed content according to the positions of the plurality of display regions 143.

Optionally, the controller 120 is further configured to send a second position determination instruction to the barrier driver 162. The barrier driver 162 is configured to determine the positions of the plurality of first barrier regions in the first barrier panel 164 according to the second position determination instruction, and drive each of the plurality of first barrier regions to form the corresponding first barrier 163 according to the positions of the plurality of first barrier regions.

Optionally, the controller 120 is further configured to send a third position determination instruction to the barrier driver 162. The barrier driver 162 is configured to determine the positions of the plurality of second barrier regions in the second barrier panel according to the third position determination instruction, and drive each of the plurality of second barrier regions to form the corresponding second barrier 167 according to the positions of the plurality of second barrier regions.

The first position determination instruction is configured to indicate the position of each display region 143. The second position determination instruction is configured to indicate the position of each of the plurality of first barrier regions. The third position determination instruction is configured to indicate the position of each of the plurality of second barrier regions.

Figure 6:
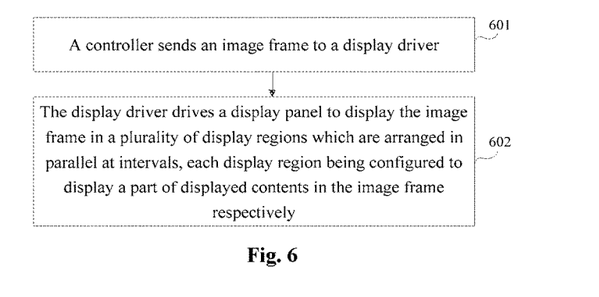
FIG. 6 is a flow chart showing a display method according to an aspect of the disclosure.

Optionally, when the position of each display region 143 is fixed, the controller 120 may dynamically determine the position of each first barrier 163 according to the ocular distance ef between the user eyes, projection coordinates of the user eyes on the display panel 144, the distances between the user eyes and the display panel 144 and a distance L between image display surfaces of the first barrier panel 164 and the display panel 144 and according to a rule shown in FIG. 6.

Optionally, when the positions of each first barrier 163 and each second barrier 167 are fixed, that is, a distance H between the first barrier panel 164 and the second barrier panel 166 is fixed, the controller 120 dynamically determines the position of each display region 143 according to the ocular distance ef between the eyes, projection coordinates of the eyes on the second barrier panel 166, distances G between the eyes and the second barrier panel 166 and a distance L between the first barrier panel 164 and the display panel 144 and according to a rule shown in FIG. 5.

In some embodiments, a manner of the controller 120 acquiring the ocular distance ef of the eyes, the projection coordinates of the eyes on the second barrier panel 166, the distances G between the eyes and the second barrier panel 166 and the distance L between the first barrier panel 164 and the display panel 144 is not limited. For example, the controller 120 may acquire these parameters using a device such as a front camera, a distance sensor, or any other sensors.

In summary, according to the display device provided by the embodiments, the controller is configured to send an image frame to the display driver. The display driver is configured to drive the display panel to display the image frame in a plurality of display regions which are arranged in parallel at intervals. Each of the plurality of display regions being configured to display a part of displayed contents in the image frame individually. The displayed content individually displayed by each of the plurality of display regions is emitted to the predetermined visible range through the first light transmission region and second light transmission region corresponding to the display region. Therefore, a display screen is protected from privacy breach by introducing the predetermined visible range. Privacy of the user is protected when using a wide-viewing-angle display screen with barrier panel. Thus, a visible range of the display panel is limited within the predetermined visible range and the image frame on the display panel cannot be viewed or completely viewed outside the predetermined visible range.

In another example provided on the basis of the example shown in FIG. 1, the display device 100 has two working modes: a wide-viewing-angle working mode and a narrow-viewing-angle working mode. The display device 100 may be switched between the two working modes.

During switching from the wide-viewing-angle working mode to the narrow-viewing-angle working mode, the controller 120 sends a first state switching instruction to the display driver 142 and the barrier driver 162. The display driver 142 and the barrier driver 162 work according to the above working mode.

During switching from the narrow-viewing-angle working mode to the wide-viewing-angle working mode, the controller 120 sends a second state switching indication to the display driver 142 and the barrier driver 162. The display driver 142 is configured to drive the display panel 142 to display the image frame in the whole display regions after receiving the second state switching indication, i.e. a conventional working mode. The barrier driver 162 is configured to drive the first barrier panel to cancel formation of the first barriers and drive the second barrier panel to cancel formation of the second barriers after receiving the second state switching indication. For example, the whole first barrier panel and the whole second barrier panel are both positioned in a transparent state or a semi-transparent state in which the light transmittance is higher than a predetermined value.

In some embodiments, two optional working modes are provided, so that display requirements of the user in different using places may be met.

In another example provided on the basis of the example shown in FIG. 1, when the display device 100 is in the narrow-viewing-angle working mode, the idle region 145 between every two adjacent display regions 143 in the display panel 144 may display a predetermined disguised displayed content, the disguised displayed content referring to a displayed content viewed in a range outside the predetermined visible range. The disguised displayed content may disguise the image frame displayed in the display regions 143. For example, if the image frame is a game picture and the disguised displayed content is a webpage picture, then the game picture is viewed within the predetermined visible range, but the webpage picture is viewed in the range outside the predetermined visible range.

The present disclosure also provides a method that may be implemented by the display device. Details not described in the method embodiment of the present disclosure may refer to the device embodiment of the present disclosure.

FIG. 6 is a flow chart showing a display method according to an aspect of the disclosure. The method is applied to the display device provided by the embodiment shown in FIG. 1 or FIG. 2, the display device including: a controller, a display driver connected with the controller, a display panel connected with the display driver, a first barrier panel positioned above the display panel and a second barrier panel positioned above the first barrier panel, wherein a plurality of first barriers which are arranged in parallel at intervals are distributed in the first barrier panel, and a first light transmission region is formed between every two adjacent first barriers; and a plurality of second barriers which are arranged in parallel at intervals are distributed in the second barrier panel, and a second light transmission region is formed between every two adjacent second barriers. The method provided by the embodiment may include the following steps.

In Step 601, the controller sends an image frame to the display driver.

In Step 602, the display driver drives the display panel to display the image frame in a plurality of display regions which are arranged in parallel at intervals, each of the plurality of display regions being configured to display a part of displayed contents in the image frame individually.

The displayed content individually displayed by each of the plurality of display regions may be emitted to a predetermined visible range through the first light transmission region and second light transmission region corresponding to the display region.

From the above, according to the display method provided by the embodiment, the controller sends an image frame to the display driver, and the display driver drives the display panel to display the image frame in the plurality of display regions which are arranged in parallel at intervals, each of the plurality of display regions being configured to display a part of displayed contents in the image frame individually, wherein the displayed content individually displayed by each of the plurality of display regions is emitted to the predetermined visible range through the first light transmission region and the second light transmission region corresponding to the display region. Therefore, others around a user cannot easily view contents on a display screen and thus leakage of privacy of the user is avoided when the display screen is a wide-viewing-angle display screen. A visible range of the display panel can be limited within the predetermined visible range, and thus the image frame on the display panel cannot be viewed or completely viewed outside the predetermined visible range.

Figure 7:
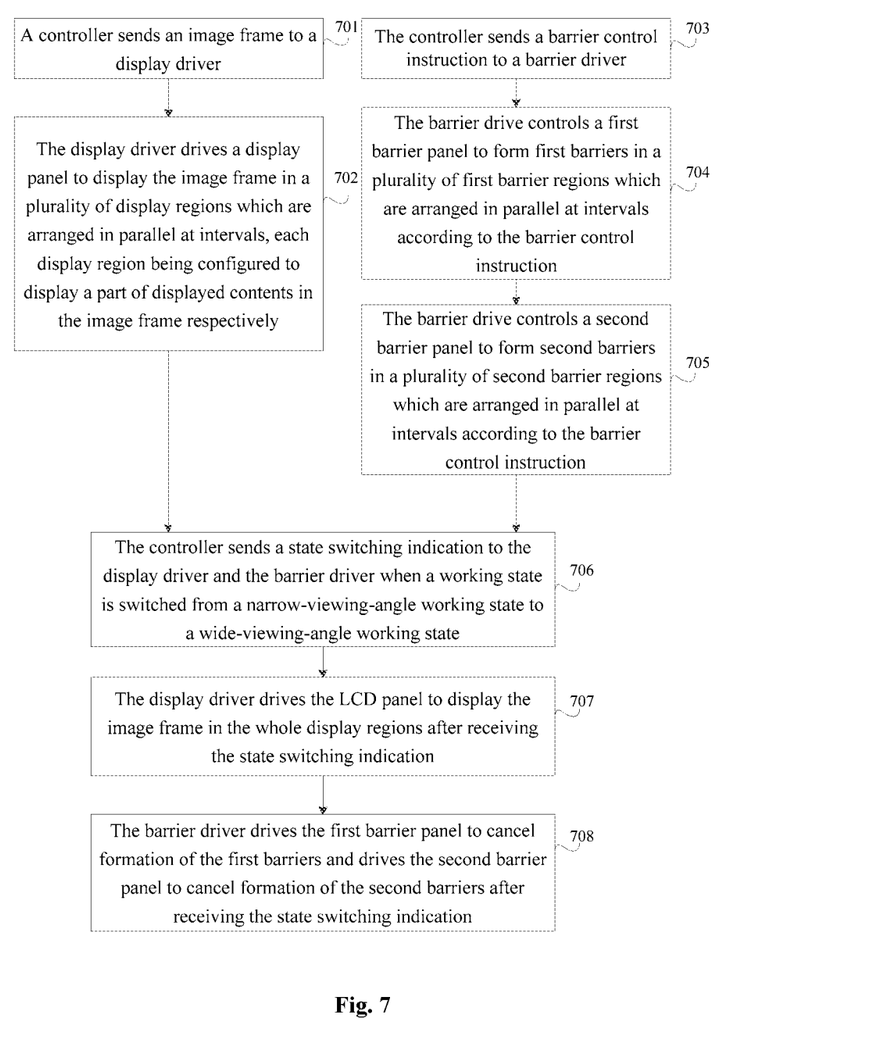
FIG. 7 is a flow chart showing a display method according to another aspect of the disclosure.

In an example provided on the basis of the example shown in FIG. 6, as shown in FIG. 7, the method includes the following steps.

In Step 701, the controller sends an image frame to the display driver.

A display stream usually includes an image frame sequence formed by multiple image frames, so that the step may be periodically executed for many times, or executed when the image frame changes.

For example, the controller executes the step once every ¹⁄₂₄ second.

In Step 702, the display driver drives the display panel to display the image frame in a plurality of display regions which are arranged in parallel at intervals, each of the plurality of display regions being configured to display a part of displayed contents in the image frame individually.

As a possible implementation mode, the step may include the following steps:

1: the display driver determines positions of a plurality of display regions in the display panel according to pre-stored first position information;

2: the display driver splits the image frame to obtain a displayed content corresponding to each of the plurality of display regions; and 3: the display driver drives each of the plurality of display regions to display the corresponding displayed content according to the positions of the plurality of display regions.

According to another possible implementation mode, the controller also sends a first position determination instruction to the display driver, the first position determination instruction being configured to indicate the position of each display region. Correspondingly, the step may include the following steps:

1: the display driver receives the first position determination instruction sent by the controller;

2: the display driver determines the positions of the plurality of display regions in the display panel according to the first position determination instruction;

3: the display driver splits the image frame to obtain the displayed content corresponding to each display region; and 4: the display driver drives each display region to display the corresponding displayed content according to the positions of the plurality of display regions.

It is to note that the first barrier panel may include a first film on which a plurality of first barriers arranged in parallel at intervals are distributed and the second barrier panel may include a second film on which a plurality of second barriers arranged in parallel at intervals are distributed.

Optionally, the display device further includes a barrier driver. The barrier driver is connected with the controller, the first barrier panel, and the second barrier panel. The display method further includes the following steps.

In Step 703, the controller sends a barrier control instruction to the barrier driver.

In Step 704, the barrier driver controls the first barrier panel to form the first barriers in a plurality of first barrier regions which are arranged in parallel at intervals according to the barrier control instruction.

As a possible implementation mode, the step may include the following steps:

1: the barrier driver determines positions of the plurality of first barrier regions in the first barrier panel according to pre-stored second position information; and 2: the barrier driver drives each first barrier region to form the corresponding first barrier according to the positions of the plurality of first barrier regions.

As another possible implementation mode, the controller further sends a second position determination instruction to the barrier driver, the second position determination instruction being configured to indicate the position of each first barrier. Correspondingly, the step may include the following steps:

1: the barrier driver receives the second position determination instruction from the controller;

2: the barrier driver determines the positions of the plurality of first barrier regions in the first barrier panel according to the second position determination instruction; and 3: the barrier driver drives each first barrier region to form the corresponding first barrier according to the positions.

The displayed content individually displayed by each display region is emitted to a predetermined visible range by the light which is emitted by a backlight source and transmitted through a first light transmission region between every two adjacent first barriers on the first barrier panel. Optionally, the predetermined visible range is a range determined according to an ocular distance between eyes of a person.

In Step 705, the barrier driver controls the second barrier panel to form the second barriers in a plurality of second barrier regions which are arranged in parallel at intervals according to the barrier control instruction.

As a possible implementation mode, the step may include the following steps:

1: the barrier driver determines positions of a plurality of second barrier regions in the second barrier panel according to pre-stored third position information; and 2: the barrier driver drives each second barrier region to form the corresponding second barrier according to the positions of the plurality of second barrier regions.

As another possible implementation mode, the controller further sends a third position determination instruction to the barrier driver, the third position determination instruction being configured to indicate the position of each second barrier. Correspondingly, the step may include the following steps:

1: the barrier driver receives the third position determination instruction from the controller;

2: the barrier driver determines the positions of the plurality of second barrier regions in the second barrier panel according to the third position determination instruction; and 3: the barrier driver drives each second barrier region to form the corresponding second barrier according to the positions of the plurality of second barrier regions.

The displayed content individually displayed by each of the plurality of display regions is emitted to the predetermined visible range through the first light transmission region and the second light transmission region corresponding to the display region.

Optionally, the predetermined visible range is the range determined according to the ocular distance between the eyes of a person.

Steps 701-702 are executed in parallel with Steps 703-705.

Optionally, a narrow-viewing-angle working state may be switched to a wide-viewing-angle working state through the following Steps 706-708.

In Step 706, the controller sends a state switching indication to the display driver and the barrier driver when a working state is switched from a narrow-viewing-angle working state to a wide-viewing-angle working state.

In Step 707, the display driver drives the display panel to display the image frame in the whole display regions after receiving the state switching indication.

In Step 708, the barrier driver drives the first barrier panel to cancel formation of the first barriers and drives the second barrier panel to cancel formation of the second barriers after receiving the state switching indication.

Step 707 and Step 708 are steps which may be executed in parallel.

It is to note that a process executed when the working state is switched from the wide-viewing-angle working state to the narrow-viewing-angle working state is an inverse process of Step 701 to Step 708, which is apparent to those skilled in the art with reference to the descriptions of Steps 701 to 708 and to the descriptions in the above device embodiment, and thus will not be elaborated herein.

It is also to note that the display driver drives an idle region between every two adjacent display regions on the display panel to enter a non-working state or the display driver drives the idle region on the display panel to display a predetermined disguised displayed content when the working state is the narrow-viewing-angle working state.

Other embodiments of the present disclosure will be apparent to those skilled in the art from consideration of the specification and practice of the present disclosure. This application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A display device, comprising:
   a controller;
   a display driver connected with the controller;
   a display panel connected with the display driver;
   a first barrier panel positioned above the display panel; and
   a second barrier panel positioned above the first barrier panel,
   wherein the first barrier panel comprises a plurality of first barriers that are arranged in parallel at intervals in the first barrier panel, and a first light transmission region is between every two adjacent first barriers;
   wherein the second barrier panel comprises a plurality of second barriers that are arranged in parallel at intervals are distributed in the second barrier panel, and a second light transmission region is between every two adjacent second barriers;
   wherein the controller is configured to send an image frame to the display driver;
   wherein the display driver is configured to drive the display panel to display the image frame in a plurality of display regions which are arranged in parallel at intervals, each display region being configured to display a part of displayed contents in the image frame individually; and
   wherein the part of the displayed contents individually displayed by a predetermined display region is emitted to a predetermined visible range through one or more first light transmission regions and one or more second light transmission regions corresponding to the predetermined display region;
   wherein the display driver is further configured to drive an idle region between every two adjacent display regions on the display panel to enter a non-working state; or, drive an idle region between every two adjacent display regions on the display panel to display a predetermined disguised displayed content.

2. The display device of claim 1, wherein
   the display driver is configured to determine positions of the plurality of display regions in the display panel according to pre-stored first position information, split the image frame to obtain the part of the displayed contents corresponding to each display region and drive each display region to display the corresponding part of the displayed contents according to the positions of the plurality of display regions;
   or,
   the controller is further configured to send a first position determination instruction to the display driver; and the display driver is configured to determine positions of the plurality of display regions in the display panel according to the first position determination instruction, split the image frame to obtain the part of the displayed contents corresponding to each display region and drive each display region to display the corresponding part of the displayed contents according to the positions of the plurality of display regions.

3. The display device of claim 1, further comprising a barrier driver, wherein the barrier driver is connected with the controller, the first barrier panel and the second barrier panel individually; wherein
   the controller is further configured to send a barrier control instruction to the barrier driver; and
   the barrier driver is configured to, according to the barrier control instruction, control the first barrier panel to form the plurality of first barriers in a plurality of first barrier regions which are arranged in parallel at intervals and control the second barrier panel to form the plurality of second barriers in a plurality of second barrier regions which are arranged in parallel at intervals.

4. The display device of claim 3, wherein
the barrier driver is configured to determine positions of the plurality of first barrier regions in the first barrier panel according to pre-stored second position information, and drive each first barrier region to form the corresponding first barrier according to the positions of the plurality of first barrier regions;

or, the controller is further configured to send a second position determination instruction to the barrier driver, and the barrier driver is configured to determine positions of the plurality of first barrier regions in the first barrier panel according to the second position determination instruction, and drive each first barrier region to form the corresponding first barrier according to the positions of the plurality of first barrier regions.

5. The display device of claim 3, wherein
the barrier driver is configured to determine positions of the plurality of second barrier regions in the second barrier panel according to pre-stored third position information, and drive each second barrier region to form the corresponding second barrier according to the positions of the plurality of second barrier regions;

or, the controller is further configured to send a third position determination instruction to the barrier driver, and the barrier driver is configured to determine positions of the plurality of second barrier regions in the second barrier panel according to the third position determination instruction, and drive each second barrier region to form the corresponding second barrier according to the positions of the plurality of second barrier regions.

6. The display device of claim 3, wherein
the controller is further configured to send a state switching indication to the display driver and the barrier driver when a working state is switched from a narrow-viewing-angle working state to a wide-viewing-angle working state;

the display driver is configured to drive the display panel to display the image frame in the plurality of display regions after receiving the state switching indication; and the barrier driver is configured to drive the first barrier panel to cancel formation of the plurality of first barriers and drive the second barrier panel to cancel formation of the plurality of second barriers after receiving the state switching indication.

7. The display device of claim 1, wherein the first barrier panel comprises a first film on which the plurality of first barriers arranged in parallel at intervals are distributed, and the second barrier panel comprises a second film on which the plurality of second barriers arranged in parallel at intervals are distributed.

8. The display device of claim 1, wherein the predetermined visible range is a range determined according to an ocular distance between human eyes.

9. A display method, applied to a display device comprising: a controller, a display driver connected with the controller, a display panel connected with the display driver, a first barrier panel positioned above the display panel and a second barrier panel positioned above the first barrier panel; wherein a plurality of first barriers which are arranged in parallel at intervals are distributed in the first barrier panel, and a first light transmission region is formed between every two adjacent first barriers; and a plurality of second barriers which are arranged in parallel at intervals are distributed in the second barrier panel, and a second light transmission region is formed between every two adjacent second barriers, comprising:

sending, by the controller, an image frame to the display driver;

driving, by the display driver, the display panel to display the image frame in a plurality of display regions which are arranged in parallel at intervals;

displaying, by each display region, a part of displayed contents in the image frame individually;

causing the part of the displayed contents individually displayed by each display region to be emitted to a predetermined visible range through the first light transmission region and the second light transmission region corresponding to the display region; and driving, by the display driver, an idle region between every two adjacent display regions on the display panel to enter a non-working state, or, driving, by the display driver, an idle region between every two adjacent display regions on the display panel to display a predetermined disguised displayed content.

10. The display method of claim 9, wherein driving, by the display driver, the display panel to display the image frame in the plurality of display regions which are arranged in parallel at intervals comprises:

determining, by the display driver, positions of the plurality of display regions in the display panel according to pre-stored first position information, splitting the image frame to obtain the part of the displayed contents corresponding to each display region, and driving each display region to display the corresponding part of the displayed contents according to the positions of the plurality of display regions;

or, receiving, by the display driver, a first position determination instruction from the controller, determining positions of the plurality of display regions in the display panel according to the first position determination instruction, splitting the image frame to obtain the part of the displayed contents corresponding to each display region, and driving each display region to display the corresponding part of the displayed contents according to the positions of the plurality of display regions.

11. The display method of claim 9, wherein the display device further comprises:

a barrier driver which is connected with the controller, the first barrier panel and the second barrier panel individually;

the method further comprises:

sending, by the controller, a barrier control instruction to the barrier driver; and controlling, by the barrier driver, the first barrier panel to form the plurality of first barriers in a plurality of first barrier regions which are arranged in parallel at intervals and controlling the second barrier panel to form the plurality of second barriers in a plurality of second barrier regions which are arranged in parallel at intervals according to the barrier control instruction.

12. The display method of claim 11, wherein controlling, by the barrier driver, the first barrier panel to form the plurality of first barriers in the plurality of first barrier regions which are arranged in parallel at intervals according to the barrier control instruction comprises:

determining, by the barrier driver, positions of the plurality of first barrier regions in the first barrier panel according to pre-stored second position information, and driving each first barrier region to form the corresponding first barrier according to the positions of the plurality of first barrier regions;

or, sending, by the controller, a second position determination instruction to the barrier driver; and determining, by the barrier driver, positions of the plurality of first barrier regions in the first barrier panel according to the second position determination instruction, and driving each first barrier region to form the corresponding first barrier according to the positions of the plurality of first barrier regions.

13. The display method of claim 11, wherein controlling, by the barrier driver, the second barrier panel to form the plurality of second barriers in the plurality of second barrier regions which are arranged in parallel at intervals according to the barrier control instruction comprises:

determining, by the barrier driver, positions of the plurality of second barrier regions in the second barrier panel according to pre-stored third position information, and driving each second barrier region to form the corresponding second barrier according to the positions of the plurality of second barrier regions;

or, sending, by the controller, a third position determination instruction to the barrier driver; and determining, by the barrier driver, positions of the plurality of second barrier regions in the second barrier panel according to the third position determination instruction, and driving each second barrier region to form the corresponding second barrier according to the positions of the plurality of second barrier regions.

14. The display method of claim 11, further comprising:

sending, by the controller, a state switching indication to the display driver and the barrier driver when a working state is switched from a narrow-viewing-angle working state to a wide-viewing-angle working state;

driving, by the display driver, the display panel to display the image frame in the plurality of display regions after receiving the state switching indication; and driving, by the barrier driver, the first barrier panel to cancel formation of the plurality of first barriers and driving the second barrier panel to cancel formation of the plurality of second barriers after receiving the state switching indication.

15. The display method of claim 9, wherein the first barrier panel comprises a first film on which the plurality of first barriers arranged in parallel at intervals are distributed, and the second barrier panel comprises a second film on which the plurality of second barriers arranged in parallel at intervals are distributed.

16. The display method of claim 9, wherein the predetermined visible range is a range determined according to an ocular distance between human eyes.

* * * * *